(12) United States Patent
Sakatani

(10) Patent No.: US 9,676,081 B2
(45) Date of Patent: Jun. 13, 2017

(54) FEED STRUCTURE AND GRIPPING DEVICE INCLUDING SAME

(71) Applicant: KAWATATEC CORP., Nara (JP)

(72) Inventor: Yasushi Sakatani, Nara (JP)

(73) Assignee: KAWATATEC CORP, Nara (JP)

( * ) Notice: Subject to any disclaimer, the term of this patent is extended or adjusted under 35 U.S.C. 154(b) by 0 days.

(21) Appl. No.: 15/318,847

(22) PCT Filed: Jun. 23, 2015

(86) PCT No.: PCT/JP2015/067975
§ 371 (c)(1),
(2) Date: Dec. 14, 2016

(87) PCT Pub. No.: WO2016/017322
PCT Pub. Date: Feb. 4, 2016

(65) Prior Publication Data
US 2017/0106502 A1    Apr. 20, 2017

(30) Foreign Application Priority Data

Jul. 30, 2014    (JP) .................................. 2014-154524

(51) Int. Cl.
*B66C 1/42*        (2006.01)
*B25B 5/02*        (2006.01)
(Continued)

(52) U.S. Cl.
CPC ................. *B25B 5/02* (2013.01); *F16H 1/32* (2013.01); *F16H 25/20* (2013.01); *F16H 2025/2087* (2013.01)

(58) Field of Classification Search
CPC .... B25B 5/02; F16H 1/32; F16H 25/20; B25J 15/022
(Continued)

(56) References Cited

U.S. PATENT DOCUMENTS 1,768,856 A * 7/1930 Murray ................... F16D 23/04
                                                        192/53.31
2,383,170 A * 8/1945 Stoll ......................... B25B 1/22
                                                        269/73
(Continued)

FOREIGN PATENT DOCUMENTS

JP            01158249 A      6/1989
JP            09159009 A      6/1997
(Continued)

*Primary Examiner* — Paul T Chin
(74) *Attorney, Agent, or Firm* — Miller, Matthias & Hull LLP

(57) ABSTRACT

A chuck is composed of a body (2), gripping jaws (10) provided on the body (2), and feed structures (20) disposed in containing chambers (4) of the body (2), and the feed structure (20) is composed of a cylindrical body (21) having a male screw portion (22) formed thereon, a first receiving body (27) fitted in one end side of the cylindrical body (21), a second receiving body (35) fitted in the other end side of the cylindrical body (21), an eccentric shaft (40) consisting of an base shaft portion (41) and an eccentric portion (42), an external gear (45) having a through hole (46) formed to extend from front to rear through an central portion thereof and having the eccentric portion (42) of the eccentric shaft (40) inserted in the through hole (46), an internal gear (50) having a teeth portion partially meshing with a part of a teeth portion of the external gear (45), a screw body (55) composed of a screw member (56) and a flange member (60), and a coupling body (65) disposed between the first receiving body (27) and the external gear (45).

4 Claims, 14 Drawing Sheets

(51) Int. Cl.
 *F16H 1/32* (2006.01)
 *F16H 25/20* (2006.01)
(58) Field of Classification Search
 USPC ....... 294/202, 203, 116, 207, 119.1; 269/32, 269/34, 225, 226; 475/162; 74/332; 901/37
 See application file for complete search history.

(56) References Cited

U.S. PATENT DOCUMENTS

| | | | | |
|---|---|---|---|---|
| 2,887,860 A * | 5/1959 | Bellman | ................ | A41B 11/02 66/172 R |
| 3,208,744 A * | 9/1965 | Slifer, Jr. | ................ | B25B 1/103 269/219 |
| 3,792,851 A * | 2/1974 | Newswanger | ............ | B25B 1/18 269/221 |
| 3,927,872 A * | 12/1975 | Sessody | .................... | B25B 1/18 269/32 |
| 4,438,911 A * | 3/1984 | McDougal | ................ | B25B 1/18 269/157 |
| 4,591,199 A * | 5/1986 | Zajac | .................... | B25J 15/0253 269/32 |
| 4,765,668 A * | 8/1988 | Slocum | ................ | B25J 15/0052 294/119.1 |
| 2001/0028175 A1* | 10/2001 | Thompson | ............. | B25J 15/026 294/119.1 |
| 2014/0028118 A1* | 1/2014 | Sakano | .................... | H02K 7/00 310/12.14 |

FOREIGN PATENT DOCUMENTS

| | | |
|---|---|---|
| JP | 2000117646 A | 4/2000 |
| JP | 2001165248 A | 6/2001 |
| JP | 2004306256 A | 11/2004 |
| JP | 2014177981 A | 9/2014 |

* cited by examiner

FEED STRUCTURE AND GRIPPING DEVICE INCLUDING SAME

CROSS-REFERENCE TO RELATED APPLICATIONS

This application is a U.S. National Stage filing under 35 USC §371 of International Patent Application No. PCT/JP2015/067975 filed on Jun. 23, 2015.

FIELD OF THE DISCLOSURE

The present invention relates to a feed structure that is used in a feed screw mechanism for moving a jaw or a movable body forward and backward, and also relates to a gripping device including the feed structure. More particularly, the present invention relates to a feed structure equipped with a mechanism for amplifying a gripping force generated by the jaw or movable body, and also relates to a gripping device including the feed structure.

BACKGROUND OF THE DISCLOSURE

Examples of the above-mentioned gripping device include a chuck that grips an object with jaws screwed with feed screws, and a vice that grips an object with a movable body screwed with a feed screw and a fixed body fixed to a base.

By the way, in the case where an operation in which a large load is applied to a gripped object is performed, it is necessary to increase a force gripping the object. Therefore, there has been proposed a gripping device including a mechanism for amplifying the gripping force. An example of such a gripping device is a vice disclosed in Japanese Unexamined Patent Application Publication No. 2000-117646.

This vice includes a body having guide rails formed thereon, a fixed jaw formed integrally with the body, a movable jaw arranged in a manner to be movable in directions toward and away from the fixed jaw while being guided by the guide rails, a spindle engaged with the movable jaw for moving the movable jaw forward and backward, a force increasing mechanism moving the spindle, and other components. The force increasing mechanism includes a pressing member that is moved with an amplified force generated by amplifying, by a mechanical action, a rotational force generated by driving and rotating a drive shaft with a handle or the like, and the spindle is in contact with the pressing member.

In this vice, when gripping an object, the movable jaw is moved toward the fixed jaw by rotating the spindle and the object is gripped with the movable jaw and the fixed jaw, and then the pressing member of the force increasing mechanism is moved. Thereby, the spindle is pressed by the pressing member and thereby moved and the movable jaw engaged with the spindle is further moved toward the object, whereby the force gripping the object is additionally amplified.

Further, as for a mechanism for amplifying a gripping force, there has been proposed also a configuration as shown in FIGS. 18 and 19. Note that FIGS. 18 and 19 show a part of a chuck 100 including a mechanism for amplifying a gripping force.

As shown in FIGS. 18 and 19, the chuck 100 is composed of a board shaped body 101, a gripping jaw 102 having a screw hole 102a formed therein and configured to be moved forward and backward along a guide groove formed in the body 101, a feed screw 103 screwed with the screw hole 102a of the gripping jaw 102 and having a hexagonal portion 103a formed at one end thereof, a first gear 104 having an arcuate shape and fixed to an outer peripheral surface of the body 101 to surround the one end of the feed screw 103, a crank 105 having at one end thereof a second gear 106, which meshes with the first gear 104, and a hexagonal portion 105a, to which a handle 107 mentioned below is attached, and attached at the other end thereof to the hexagonal portion 103a of the feed screw 103, the handle 107 attached to the hexagonal portion 105a, and other components.

According to this chuck 100, in a state where the crack 105 and the handle 107 are detached, the gripping jaw 102 is moved toward an object by rotating the feed screw 103 to cause the object to be gripped by the gripping jaw 102. Thereafter, the crank 105 and the handle 107 are attached and the handle 107 is rotated. Thereby, a handle torque is amplified by a factor of a predetermined reduction gear ratio and the amplified handle torque is input into the feed screw 103.

Note that the reduction gear ratio is determined by:

$$\text{Reduction gear ratio} = Z1'/Z2'+1, \quad \text{(Equation 1)}$$

wherein $Z1'$ is the number of teeth of the first gear and $Z2'$ is the number of teeth of the second gear. Based on a structural relationship, the reduction gear ratio is about 5 to 8.

Thus, in each of the above-described grapping devices, a thrust generated by the feed screw can be additionally amplified.

However, in the above-described vice, because of the configuration in which the force increasing mechanism is provided at one end side of the spindle, it is unavoidable that the overall size of the vice is increased by the force increasing mechanism. Further, the above-described chuck has a problem that, even when a stronger gripping force is desired to be applied to the object, there is a limit to the gripping force applied to the object due to structural problems.

Accordingly, the applicant of the present application has proposed a feed structure which is capable of applying a strong gripping force to an object and which allows a gripping device to have a smaller size than the conventional devices (Japanese Patent Application No. 2013-051544).

As shown in FIGS. 20 and 21, this feed structure 200 is composed of a cylindrical body 201 having a male screw portion 202 formed on an outer peripheral surface thereof and having a female screw portion 203 formed on a portion of an inner peripheral surface thereof, a first receiving body 204 having a through hole formed therein and fitted in one end side of the cylindrical body 201, a second receiving body 206 fitted in the other end side of the cylindrical body 201, an eccentric shaft 207 consisting of a base shaft portion 208 and an eccentric portion 209, the base shaft portion 208 being inserted in the through hole of the first receiving body 204, an external gear 210 having a teeth portion formed on an outer peripheral surface thereof and having a through hole bored through the center thereof, the trough hole having the eccentric portion 209 of the eccentric shaft 207 inserted therein, an internal gear 212 having a teeth portion formed on an inner peripheral surface thereof, the teeth portion partially meshing with the teeth portion of the external gear 210, and a screw body 213 having a male screw portion formed on an outer peripheral surface thereof and disposed in the cylindrical body 201 with the male screw portion thereof meshing with the female screw portion 203 of the cylindrical body 201, and with one end side thereof being engaged with the internal gear 212.

Further, the first receiving body 204 has a plurality of recesses 205 formed in a surface thereof facing the external gear 210, the recesses 205 being formed at equal intervals along a circumferential direction of the first receiving body 204. Further, the external gear 210 has protrusions 211 formed on a surface thereof facing the first receiving body 204, the protrusions 211 being formed at equal intervals along a circumferential direction of the external gear 210 and being freely fitted in the recesses 205. Note that the feed structure 200 has a configuration in which the internal gear 212 has more tooth than the external gear 210.

In this feed structure 200, for example, in a state where the feed structure 200 is rotatably supported in a predetermined posture in an appropriate chuck body and the male screw portion 202 formed on the outer peripheral surface of the cylindrical body 201 meshes with a female screw portion of an appropriate gripping jaw, the first receiving body 204 is rotated in a predetermined direction to move the gripping jaw and bring the gripping jaw into contact with an object, and then the eccentric shaft 207 is rotated in a predetermined direction. Thereby, the external gear 210 with the eccentric portion 209 of the eccentric shaft 207 being inserted therein is turned with a radius equal to eccentricity of the eccentric portion 209 around an axial center of the base shaft portion 208 and the internal gear 212 meshing with the external gear 210 is rotated in the same direction by one tooth per revolution of the eccentric shaft 207.

Note that the external gear 210 and the internal gear 212 in the feed structure 200 form a so-called hypocycloid mechanism. The reduction gear ratio in this hypocycloid mechanism is determined by:

Reduction gear ratio=$Z1/(Z2-Z1)+1$,  (Equation 2)

where Z1 is the number of teeth of the external gear 210 and Z2 is the number of teeth of the internal gear 212.

Therefore, for example, in the case where the number of teeth of the external gear 210 (Z1) is 29 and the number of teeth of the internal gear 212 (Z2) is 30, the reduction gear ratio obtained is 30, that is, a reduction gear ratio significantly improved over that of the above-described chuck 100 is obtained.

Further, when the internal gear 212 is rotated, the screw body 213 engaged with the internal gear 212 is rotated with a torque larger by a factor of a predetermined number than a torque input from the eccentric shaft 207, whereby the cylindrical body 201 whose female screw portion 203 is screwed with the male screw portion of the screw body 213 is moved with a large force. Therefore, a strong thrust can be added to the gripping force; consequently, the object can be gripped with a gripping force stronger than those of the conventional devices.

Further, because the hypocycloid mechanism as a force increasing mechanism is incorporated in the feed structure 200, the overall device size can be reduced.

CITATION LIST

Patent Literature

Patent document 1: Japanese Unexamined Patent Application Publication No. 2000-117646

SUMMARY OF THE INVENTION DISCLOSURE

By the way, in the above-described conventional feed structure 200, when a thrust is added to the gripping force through the hypocycloid mechanism, a strong rotational torque the external gear 210 receives from the internal gear 212 is transmitted to the first receiving body 204 through the protrusions 211 of the external gear 210 and the recesses 205 of the first receiving body 204.

When the strong rotational torque the external gear 210 receives is transmitted from the protrusions 211 to the recesses 205, for example, in the case where the eccentric shaft 207 is rotated in the direction indicated by arrow in FIG. 21, the rotational force does not act uniformly on all of the recesses 205, but a particularly large load is applied to some of the protrusions 211 and recesses 205 (recesses located at the left side in FIG. 21). Therefore, problems arise, such as shape distortion of some of the protrusions 211, expansion of the diameters of some of the recesses 205, and cracks occurring between the recesses 205. Further, there is also a problem that, because the non-uniform load is applied, a force acting from the external gear 210 on the eccentric portion 209 of the eccentric shaft 207 is non-uniform, that is, the external gear 210 is in partial contact with the eccentric portion 209; therefore, torque loss occurs due to friction and the like.

The present invention has been achieved in view of the above-described circumstances, and an object thereof is to provide a feed structure which can reduce the overall device size and generate a strong gripping force while preventing damage to the components and torque loss, and a gripping device including the feed structure.

The present invention, for solving the above-described problems, relates to a feed structure including:

a cylindrical body having a male screw portion formed on an outer peripheral surface thereof and having a female screw portion formed on at least a portion of an inner peripheral surface thereof;

a first receiving body having a through hole formed through a central portion thereof, and fitted in one end side of the cylindrical body with an axis of the through hole coincident with an axis of the cylindrical body;

a second receiving body fitted in the other end side of the cylindrical body;

a screw body disposed between the first receiving body and the second receiving body within the cylindrical body with a male screw portion formed on an outer peripheral surface thereof being screwed with the female screw portion formed on the inner peripheral surface of the cylindrical body, the screw body having a receiving hole formed in a surface thereof facing the first receiving body;

an eccentric shaft including a base shaft portion and an eccentric portion eccentric to an axis of the base shaft portion, both ends of the base shaft portion being respectively rotatably inserted in the through hole of the first receiving body and the receiving hole of the screw body;

an internal gear having a teeth portion formed on an inner peripheral surface thereof coaxially with an outer peripheral surface thereof, and disposed between the first receiving body and the screw body in a state of being engaged with the screw body so as to be rotatable integrally with the cylindrical body about the axis of the cylindrical body;

an external gear having a teeth portion formed on an outer peripheral surface thereof, having a through hole formed to extend from front to rear through a central portion thereof, and disposed inside the internal gear with a part of the teeth portion thereof meshing with a part of the teeth portion of the internal gear, and with the eccentric portion of the eccentric shaft being rotatably fitted through the through hole thereof; and a coupling body having a through hole formed to extend from front to rear through a central portion thereof, and disposed between the first receiving body and the external gear with the eccentric portion of the eccentric shaft being rotatably fitted through the through hole thereof, the cylindrical body being engaged with the first receiving body so as to be rotatable integrally with the first receiving body about the axis of the cylindrical body, the coupling body and the first receiving body being engaged with each other by a first engaging mechanism, the coupling body and the external gear being engaged with each other by a second engaging mechanism, the first engaging mechanism being composed of a first engaging groove and a first engaging portion, the first engaging groove being formed in either one of a surface of the coupling body facing the first receiving body and a surface of the first receiving body facing the coupling body, the first engaging portion being formed on the other of the surfaces to protrude therefrom and being engaged with the first engaging groove in a manner to be slidable along the first engaging groove, the second engaging mechanism being composed of a second engaging groove and a second engagement portion, the second engaging groove being formed in either one of a surface of the coupling body facing the external gear and a surface of the external gear facing the coupling body, the second engaging portion being formed on the other of the surfaces to protrude therefrom and being engaged with the second engaging groove in a manner to be slidable along the second engaging groove, the first engaging groove and the second engaging groove being shifted in phase with respect to each other around an axis of the through hole of the coupling body in a state where the coupling body is engaged with the first receiving body and engaged with the external gear, and the internal gear having more teeth than the external gear.

The present invention further relates to a gripping device including:

the above feed structure;

a body having at least two guide grooves provided to extend radially with respect to a predetermined point on a surface thereof; and at least two gripping jaws disposed to be respectively engaged with the guide grooves of the body and provided in a manner to be movable forward and backward along the guide grooves, each of the gripping jaws having a female screw portion formed along the guide groove, the feed structure being disposed below each of the gripping jaws in each of the guide grooves with the first receiving body and the second receiving body being rotatably supported, and with the male screw portion formed on the outer peripheral surface of the cylindrical body being screwed with the female screw portion of the gripping jaw.

In the feed structure according to the present invention having the above-described configuration and the gripping device including the feed structure, first, an object is arranged near the predetermined point on the body. Note that examples of the shape of the object include a solid cylindrical shape, a prism shape, and a hollow cylindrical shape. In the case of gripping a solid object, such as a solid cylindrical object or a prism shaped object, each of the gripping jaws is previously positioned at a backward position close to the periphery of the body, while in the case of gripping a hollow object, such as a hollow cylindrical object, each of the gripping jaws is previously positioned at a forward position close to the center of the body.

Subsequently, each of the first receiving bodies is rotated in a normal direction or in a reverse direction to cause the cylindrical body that is engaged with the first receiving body so as to be rotatable integrally with the first receiving body about the axis thereof to rotate in the same direction, whereby the gripping jaw whose female screw portion is screwed with the male screw portion formed on the outer peripheral surface of the cylindrical body is moved (forward or backward) along a guide direction and the gripping jaw is brought into contact with the object. Thereafter, each of the first receiving bodies is further rotated to cause the object to be gripped by the gripping jaws. Note that, because the first receiving body and the external gear are coupled to each other through the coupling body by the first and second engaging mechanisms, when the first receiving body is rotated, the external gear is also rotated in the same direction following the rotation of the first receiving body, and the internal gear meshing with the external gear is also rotated in the same direction, and further the screw body engaged with the internal gear is also rotated in the same direction.

Subsequently, each of the eccentric shafts is rotated. Thereby, similarly to the foregoing, the external gear is turned with a radius equal to eccentricity of the eccentric portion around an axial center of the base shaft portion, and the internal gear meshing with the external gear is rotated in the same direction by one tooth per revolution of the eccentric shaft.

Also in the feed structure according to the present invention, the above-mentioned hypocycloid mechanism is employed and the reduction gear ratio thereof is determined by Equation 2. Note that, in this hypocycloid mechanism, a high reduction gear ratio is obtained when the internal gear has more teeth than the external gear. However, in the case where the number of teeth of the internal gear is fixed, the highest reduction gear ratio is obtained when the number of teeth of the internal gear is greater by one than the number of teeth of the external gear. Therefore, in the feed structure according to the present invention, for most efficiently obtaining a high reduction gear ratio with a small number of teeth, a configuration is preferable in which the number of teeth of the internal gear is greater by one than the number of teeth of the external gear.

The rotation of the internal gear having obtained a large rotational torque through the hypocycloid mechanism causes the screw body engaged with the internal gear to rotate in the same direction, whereby the cylindrical body whose female screw portion is screwed with the male screw portion of the screw body is moved (forward or backward) along the axial direction thereof with a large force. Thereby, a large force is added to the force of the gripping jaw gripping the object and thereby the gripping force is amplified; consequently, the object is gripped with a stronger gripping force.

By the way, also in the feed structure according to the present invention, a strong rotational torque is applied from the external gear to the internal gear, and this rotational torque is transmitted to the first receiving body through the coupling body. However, in the feed structure according to the present invention, as described above, the first receiving body and the coupling body are engaged with each other by the first engaging mechanism and the external gear and the coupling body are engaged with each other by the second engaging mechanism. Therefore, the rotational torque of the external gear acts almost as a couple around an axial center of the eccentric shaft on the second engaging groove and second engaging portion forming the second engaging mechanism, which suppresses the occurrence of partial contact as occurring in the conventional devices. Therefore, damage to the components of the feed structure can be prevented and loss between input torque and output torque can be suppressed.

Thus, in the gripping device according to the present invention, because a so-called hypocycloid mechanism is incorporated in the feed structure, it is possible to add a large force to a force gripping an object, and therefore it is easy to apply a strong gripping force to the object. Further, the overall size of the gripping device can be reduced compared to the conventional devices. Furthermore, damage to the components and torque loss can be prevented.

The above gripping device may be a gripping device including:

the above feed structure;

a body having at least one guide groove provided in a surface thereof;

at least one gripping body fixed to or movably provided on the surface of the body; and at least one gripping jaw disposed to be engaged with the guide groove of the body, provided in a manner to be movable forward and backward along the guide groove, and having a female screw portion formed along the guide groove, a disposed direction of the guide groove and a moving direction of the gripping body being set to be radial with respect to a predetermined point on the surface of the body, and the feed structure being disposed below the gripping jaw in the guide groove with the first receiving body and the second receiving body being rotatably supported, and with the male screw portion formed on the outer peripheral surface of the cylindrical body being screwed with the female screw portion of the gripping jaw.

According to this gripping device having the feed structure, first, an object is arranged near the predetermined point on the body. Note that, prior to the arrangement of the object, similarly to the above, in the case where the object is a solid object, the gripping jaw is previously positioned at a backward position close to the periphery of the body, while in the case where the object is a hollow object, the gripping jaw is previously positioned at a forward position close to the center of the body. Further, in the case where the gripping body is movable, the gripping body is also previously positioned at a backward position for the case of a solid object and at a forward position for the case of a hollow object.

Subsequently, the first receiving body is rotated in a predetermined direction to cause the cylindrical body that is engaged with the first receiving body so as to be rotatable integrally with the first receiving body about the axis thereof to rotate in the same direction, whereby the gripping jaw whose female screw portion is screwed with the male screw portion of the cylindrical body is moved along the guide groove and the gripping jaw is brought into contact with the object. Further, in the case where the gripping body is movable, the gripping body is also moved toward the object and brought into contact with the object. Thereafter, the first receiving body is further rotated to cause the object to be gripped by the gripping jaw and the gripping body.

Thereafter, the eccentric shaft is rotated to cause the external gear with the eccentric portion of the eccentric shaft being inserted therein to be turned with a radius equal to the eccentricity of the eccentric portion around the axial center of the base shaft portion, whereby, as described above, the internal gear meshing with the external gear is rotated with a large torque obtained through the hypocycloid mechanism and the screw body engaged with the internal gear is rotated.

Thereby, the cylindrical body whose female screw portion is screwed with the male screw portion of the screw body is moved with a large thrust and a large force is added to the gripping force acting on the object.

As described above, according to the feed structure of the present invention and the gripping device including the feed structure, it is easy to apply a strong gripping force to an object and it is possible to reduce the overall device size. Furthermore, the occurrence of partial contact as occurring in the conventional devices can be suppressed; therefore, damage to the components can be prevented and loss between input torque and output torque can be suppressed.

DETAILED DESCRIPTION

Figure 1:
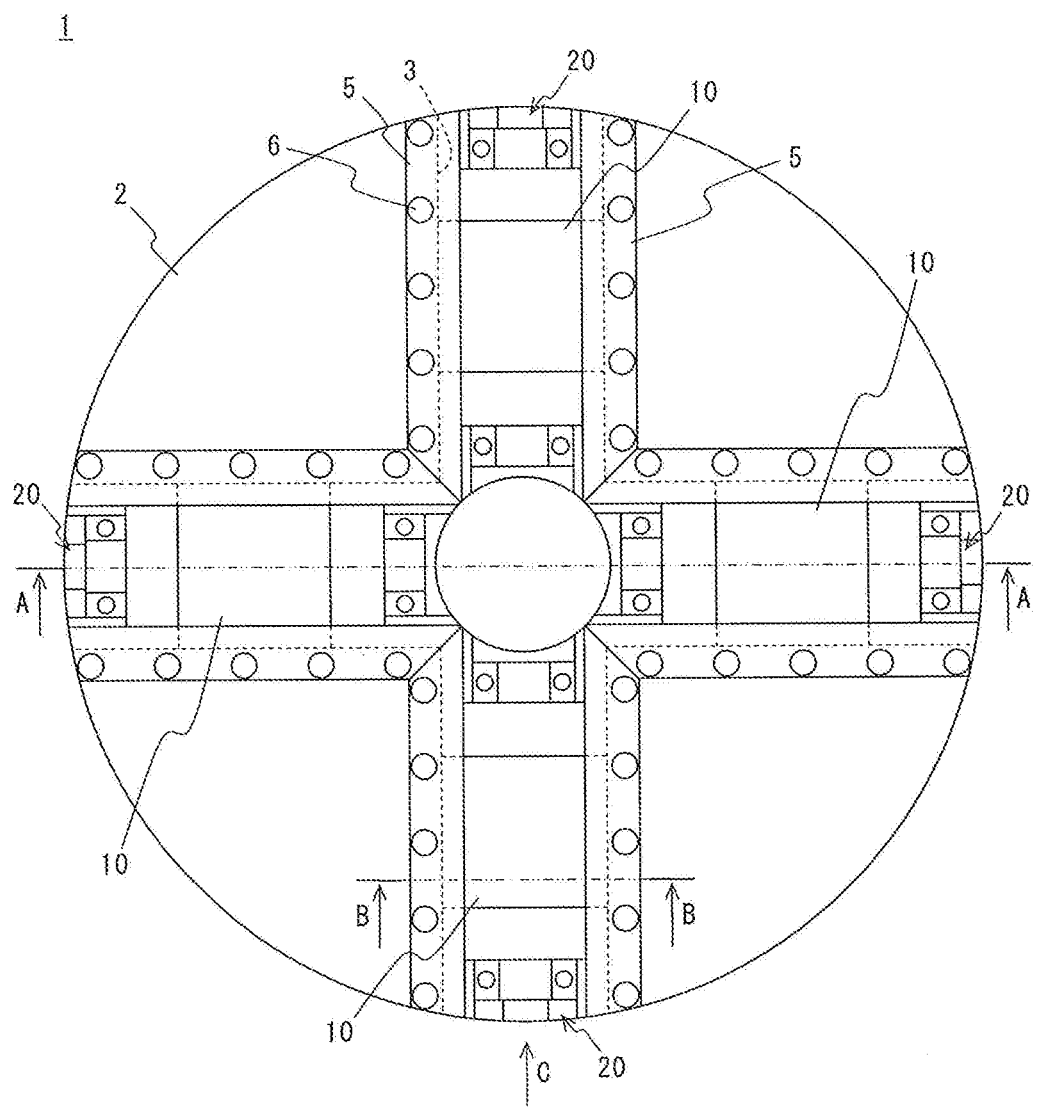
FIG. 1 is a front view of a chuck according to an embodiment of the present invention.
Figure 2:
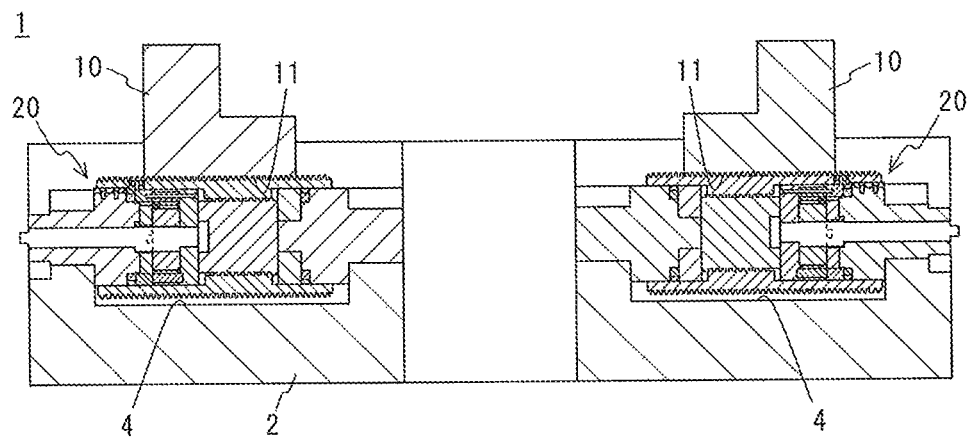
FIG. 2 is a sectional view taken along the line A-A in FIG. 1.
Figure 3:
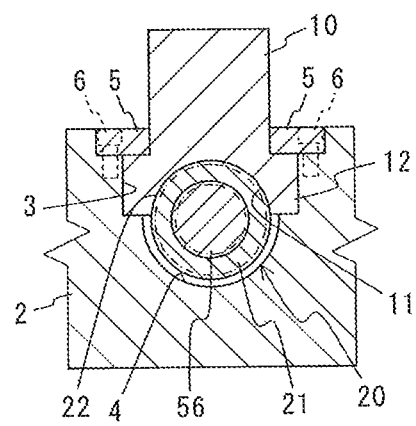
FIG. 3 is a sectional view taken along the line B-B in FIG. 1.
Figure 4:
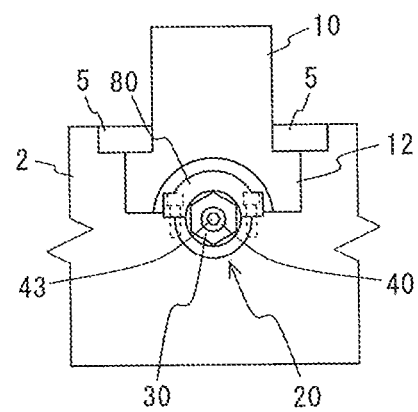
FIG. 4 is a side view seen from the direction of arrow C in FIG. 1.
Figure 5:
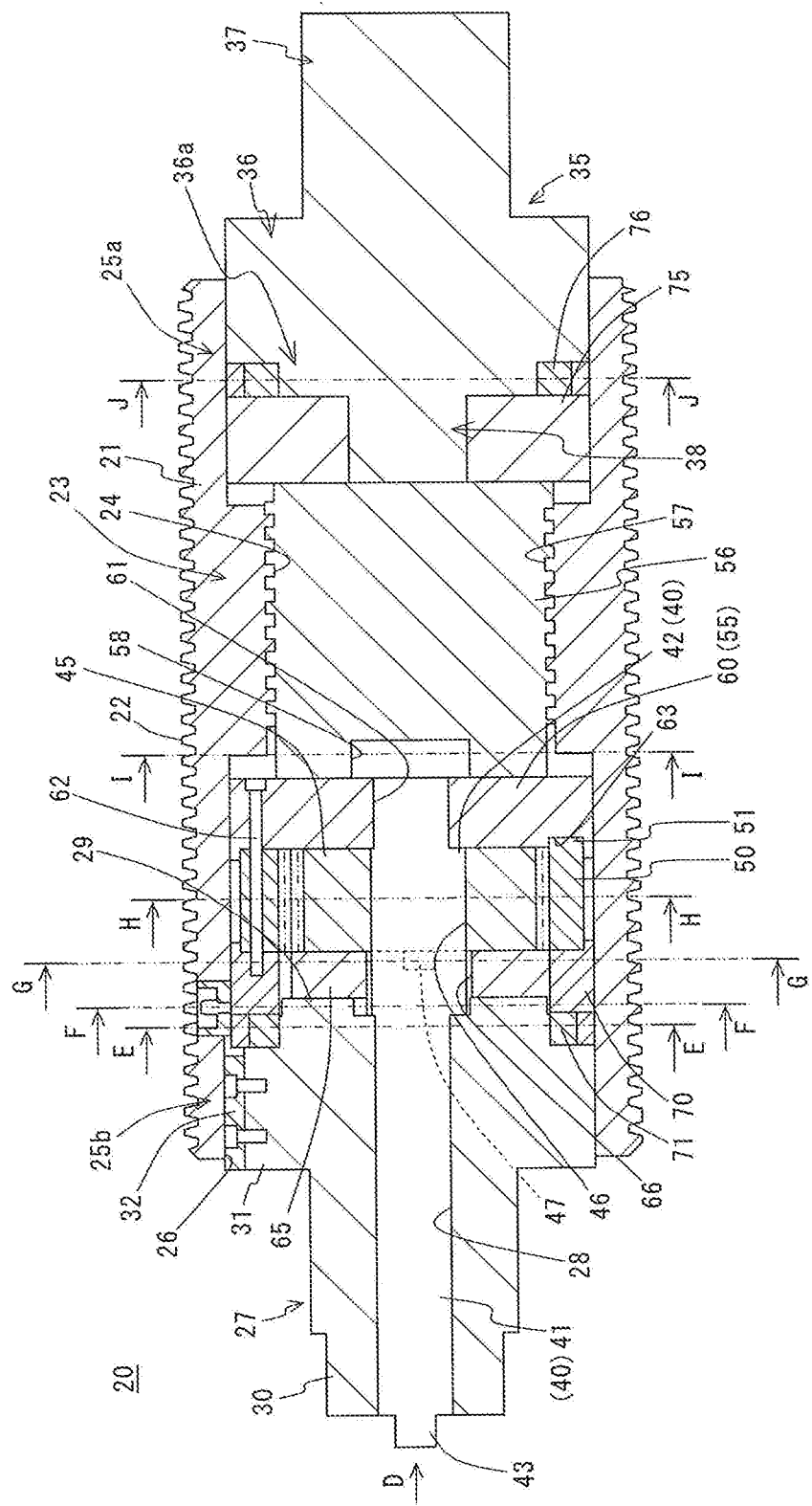
FIG. 5 is a sectional view of a feed structure.

Hereinafter, regarding a gripping device according to a specific embodiment of the present invention, a chuck will be described with reference to the drawings, by way of example.

As shown in FIGS. 1 to 4, the chuck 1 according to this embodiment is composed of a disk-shaped body 2 on which a workpiece W is to be arranged at a central portion, four gripping jaws 10 for gripping the workpiece W arranged at the central portion of the body 2, the gripping jaws 10 having the same shape and provided at equal intervals (in this embodiment, at 90 degree intervals) in a circumferential direction of the body 2 in a manner to be movable forward and backward along a radial direction of the body 2, and four feed structures 20 disposed along the radial direction of the body 2 for moving the four gripping jaws 10 forward and backward.

Note that the radial direction means a direction extending radially from the center of the body 2.

The body 2 has four guide grooves 3 formed in a front end surface thereof, the guide grooves 3 having an approximately T-shaped cross-section and being formed along the radial direction of the body 2 at equal intervals (in this embodiment, at 90 degree intervals) in the circumferential direction of the body 2. The body 2 further has containing chambers 4 formed below the guide grooves 3 for disposing the four feed structures 20 therein, the containing chambers 4 having an arcuate shape in cross-sectional view and being formed to communicate with the guide grooves 3. Note that, at both sides of an upper opening of each of the guide grooves 3, rise preventing plates 5 for preventing the gripping jaw 10 engaged with the guide groove 3 from rising are fixed with bolts 6.

Each of the four gripping jaws 10 has an arcuate female screw portion 11 formed on a lower surface thereof, the female screw portion 11 extending along the moving direction of the gripping jaw 10. Further, each of the gripping jaws 10 has engaging protrusions 12 formed on lower portions of side surfaces thereof, the engaging protrusions 12 extending along the moving direction of the gripping jaw 10 and being engaged with the guide groove 3. Thus, each of the gripping jaws 10 is guided and moved along the radial direction by the guide groove 3.

Next, the configuration of the feed structure 20 is described in detail with reference to FIGS. 5 to 15.

The feed structure 20 is composed of a cylindrical body 21 having a male screw portion 22 formed on an outer peripheral surface thereof, a first receiving body 27 having a through hole 28 formed therein and fitted in one end side (the left side in FIG. 5; referred to as "rear end side" below) of the cylindrical body 21, a second receiving body 35 fitted in the other end side (the right side in FIG. 5; referred to as "front end side" below) of the cylindrical body 21, an eccentric shaft 40 consisting of a base shaft portion 41 and an eccentric portion 42 eccentric to an axis of the base shaft portion 41, the base shaft portion 41 being inserted in the through hole 28 of the first receiving body 27, an external gear 45 having a teeth portion formed on an outer peripheral surface thereof and having a through hole 46 formed to extend from front to rear through a central portion thereof, the though hole 46 having the eccentric portion 42 of the eccentric shaft 40 rotatably inserted therein, an internal gear 50 having a teeth portion formed on an inner peripheral surface thereof and having a key portion 51 formed on a front end surface thereof, a part of the teeth portion of the internal gear 50 meshing with a part of the teeth portion of the external gear 45, a screw body 55 composed of a screw member 56 and a flange member 60, the screw member 56 having a male screw portion 57 formed on an outer peripheral surface thereof, the flange member 60 being formed to have a diameter larger than that of the screw member 56 and having a key groove 58 formed in a peripheral edge portion of a rear end surface thereof, the key groove 58 being engaged with the key portion 51 of the internal gear 50, and a coupling body 65 having a through hole 66 formed through a central portion thereof and disposed between the first receiving body 27 and the external gear 45 with the eccentric portion 42 of the eccentric shaft 40 being inserted in the through hole 66.

The cylindrical body 21 has a small diameter portion 23 formed on an inner peripheral surface of an intermediate portion thereof, the small diameter portion 23 having an inner diameter reduced in a radial direction of the cylindrical body 21 and having a female screw portion 24 formed on an inner peripheral surface thereof. The cylindrical body 21 further has large diameter portions 25a and 25b formed at both sides (front end side and rear end side) of the small diameter portion 23, the large diameter portions 25a and 25b having an inner diameter larger than that of the small diameter portion 23. Further, the large diameter portion 25b located at the rear end side has a key groove 26 formed in an inner peripheral surface thereof.

Figure 6:
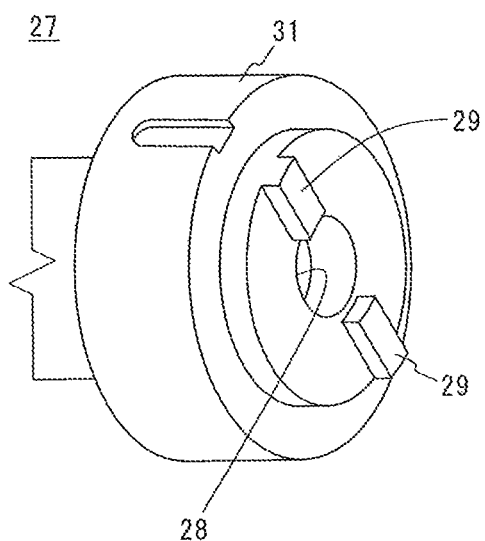
FIG. 6 is a perspective view of a first receiving body.

As shown also in FIG. 6, the first receiving body 27 comprises a member having a circular shape in vertical sectional view, and has a pair of first engaging portions 29 formed in a front end surface thereof and a hexagonal portion 30 formed on a rear end thereof; the pair of engaging portions 29 having an approximately rectangular shape and being formed to have a longitudinal extent extending along a radial direction of the first receiving body 27 in a state of protruding forward from the front end surface of the first receiving body 27 and being spaced apart with the through hole 28 therebetween. Further, the first receiving body 27 has a flange portion 31 formed on an intermediate portion thereof, the flange portion 31 having a diameter expanded in the radial direction of the first receiving body 27, and a rectangular key body 32 is fixed to an outer peripheral surface of the flange portion 31 with bolts. The first receiving body 27 is fitted in the cylindrical body 21 so that the axis of the through hole 28 coincides with the axis of the cylindrical body 21 in a state where the key body 32 is engaged with the key groove 26 of the cylindrical body 21, which allows the first receiving body 27 and the cylindrical body 21 to integrally rotate about the axis of the cylindrical body 21. Note that the key body 32 is formed to have a longitudinal extent smaller than that of the key groove 26 and engagement between the key body 32 and the key groove 26 prevents the cylindrical body 21 and the first receiving body 27 from mutually rotating about their respective axes, but allows them to mutually move along their respective axial directions.

The second receiving body 35 comprises a member having a circular shape in vertical sectional view, and has a flange portion 36 formed on an intermediate portion thereof, the flange portion 36 having a diameter expanded in a radial direction of the second receiving body 35 and having a stepped portion 36a formed on a rear end portion thereof. Further, the second receiving body 35 has a middle diameter portion 37 formed at a front end side of the flange portion 36 and a small diameter portion 38 formed at a rear end side of the flange portion 36, the middle diameter portion 37 having a diameter smaller than that of the flange portion 36, the small diameter portion 38 having a diameter smaller than that of the middle diameter portion 37.

The eccentric shaft 40, as described above, consists of the base shaft portion 41 and the eccentric portion 42 that is formed on an axial intermediate portion of the base shaft portion 41 to have an axis eccentric to the axis of the base shaft portion 41, and a rear end side of the base shaft portion 41 is rotatably inserted in the through hole 28 of the first receiving body 27. Further, the eccentric shaft 40 has a hexagonal portion 43 formed to protrude from a rear end surface thereof, and the eccentric shaft 40 can be rotated by attaching an appropriate handle to the hexagonal portion 43. Note that the reference M1 in FIGS. 11 to 13 indicates an axial center of the base shaft portion 41 and the reference M2 indicates an axial center of the eccentric portion 42.

Figure 7:
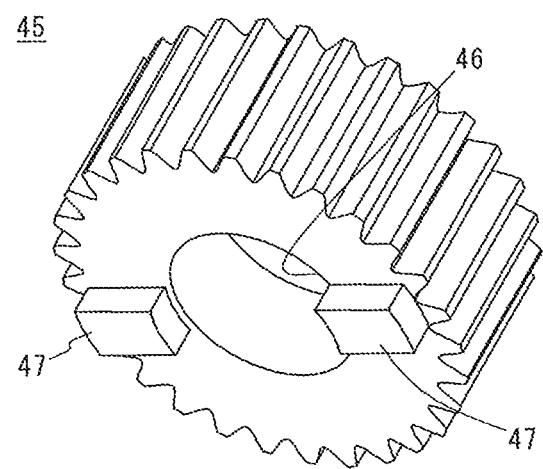
FIG. 7 is a perspective view of an external gear.

As shown also in FIG. 7, the external gear 45 has the through hole 46 bored to extend from front to rear through the central portion thereof, and has a pair of second engaging portions 47 formed on a rear end surface thereof, the pair of second engaging portions 47 having an approximately rectangular shape and being formed to have a longitudinal extent extending along a radial direction of the external gear 45 in a state of protruding backward from the rear end surface of the external gear 45 and being spaced apart with the through hole 46 therebetween. Further, the external gear 45 is disposed in the internal space of the cylindrical body 21 with the eccentric portion 42 of the eccentric shaft 40 being inserted in the through hole 46. Note that the external gear 45 in this embodiment has 26 teeth formed on the outer peripheral surface thereof.

An outer peripheral surface of the internal gear 50 has a center axis coincident with a center axis of the inner peripheral surface thereof. The internal gear 50 has the teeth portion formed on the inner peripheral surface thereof and the key portion 51 formed on a peripheral edge portion of the front end surface thereof, and is disposed in the internal space of the cylindrical body 21 with a part of the teeth portion thereof meshing with a part of the teeth portion of the external gear 45. Note that the internal gear 50 in this embodiment has 27 teeth formed on the inner peripheral surface thereof.

The screw body 55 is composed of the screw member 56 and the flange member 60 and, as described above, the screw member 56 has the male screw portion 57 formed on the outer peripheral surface thereof. The screw member 56 also has a receiving hole 58 formed in a central portion of a rear end surface thereof and engaging portions 59 formed on the rear end surface thereof, the engaging portions 59 having an arcuate shape in vertical sectional view and facing each other with the receiving hole 58 therebetween. Further, the flange portion 60 has a through hole 61 formed to extend from front to rear through a central portion thereof, and further has engaging portions 62 formed on a front end surface thereof and the key groove 63 formed in the peripheral edge portion of the rear end surface thereof, the engaging portions 62 having an arcuate shape in vertical sectional view, being engageable with the engaging portions 59 of the screw member 56, and being formed to face each other with the through hole 61 therebetween. The screw member 56 and the flange member 60 are disposed in the internal space of the cylindrical body 21 with their engaging portions 59 and 62 being engaged with each other to allow the screw member 56 and the flange portion 60 to integrally rotate, with the male screw portion 57 being screwed with the female screw portion 24 formed on the small diameter portion 23 of the cylindrical body 21, and with the key portion 51 of the internal gear 50 being engaged with the key groove 63.

By the way, in the case where one member has two or more portions having different diameters, a high machining accuracy is required in order to cause axes of the portions to coincide with each other. Accordingly, forming such portions having different diameters as separate members, like the screw body 55 in this embodiment, can reduce influence of machining errors occurring in molding. Note that, in some cases, such as where it is possible to achieve a required machining accuracy, a screw body formed by integrally forming the screw member 56 and the flange member 60 may be employed.

Figure 8:
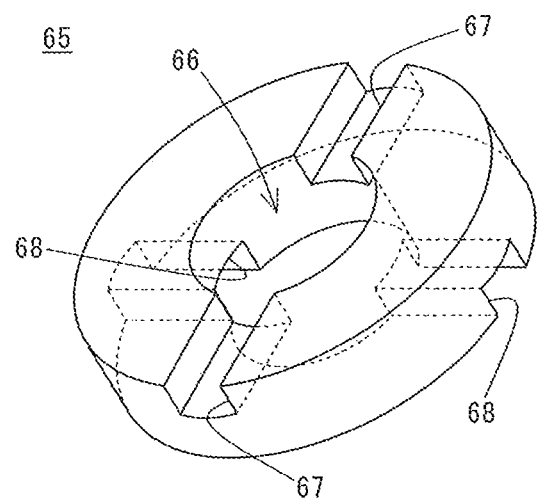
FIG. 8 is a perspective view of a coupling body.
Figure 9:
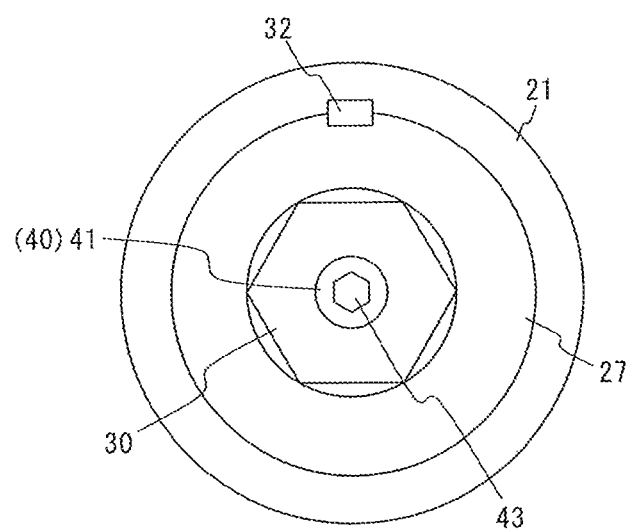
FIG. 9 is a side view seen from the direction of arrow D in FIG. 5.
Figure 10:
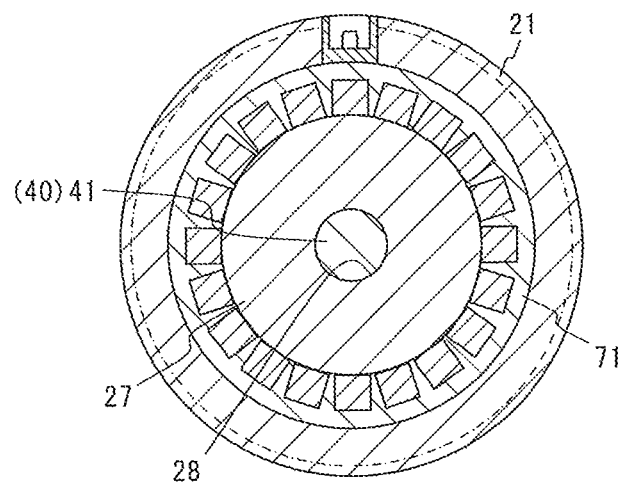
FIG. 10 is a sectional view taken along the line E-E in FIG. 5.
Figure 11:
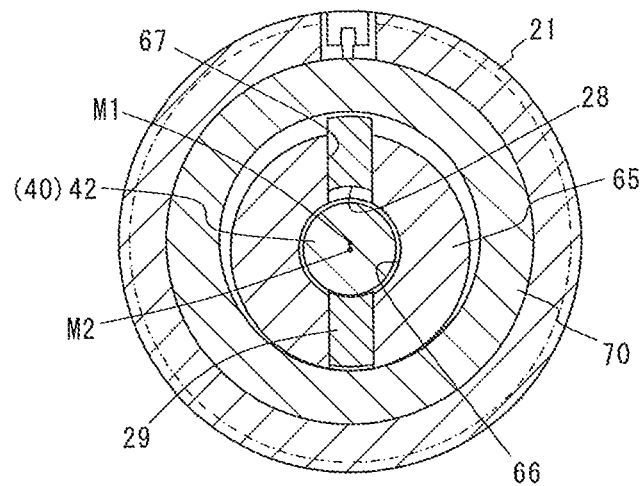
FIG. 11 is a sectional view taken along the line F-F in FIG. 5.
Figure 12:
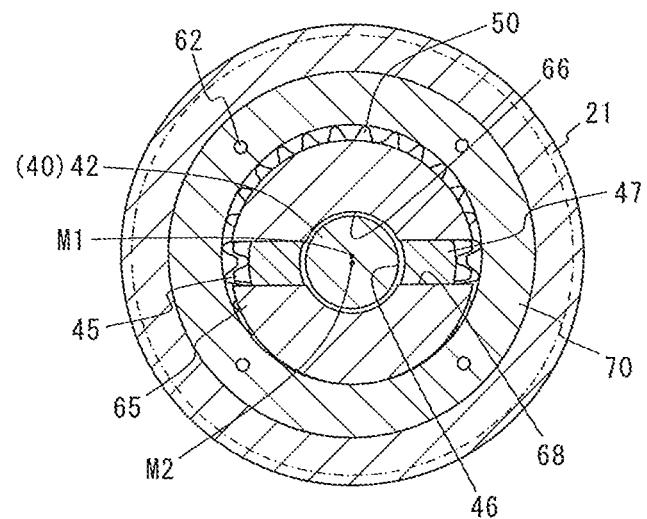
FIG. 12 is a sectional view taken along the line G-G in FIG. 5.
Figure 13:
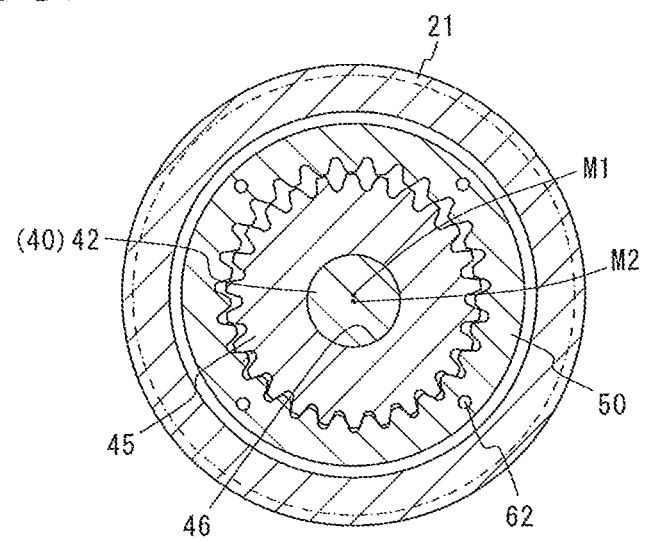
FIG. 13 is a sectional view taken along the line H-H in FIG. 5.
Figure 14:
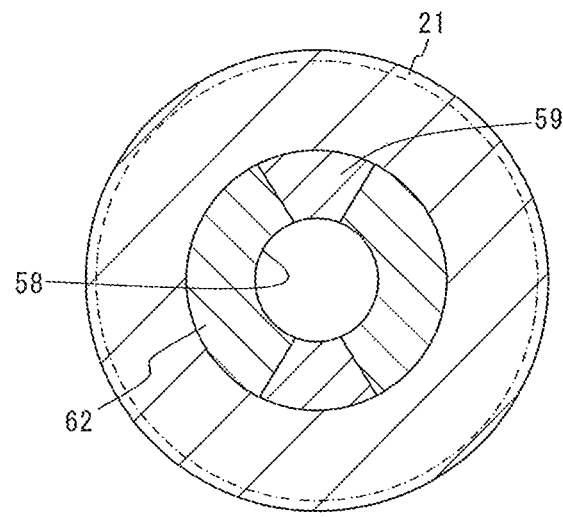
FIG. 14 is a sectional view taken along the line I-I in FIG. 5.
Figure 15:
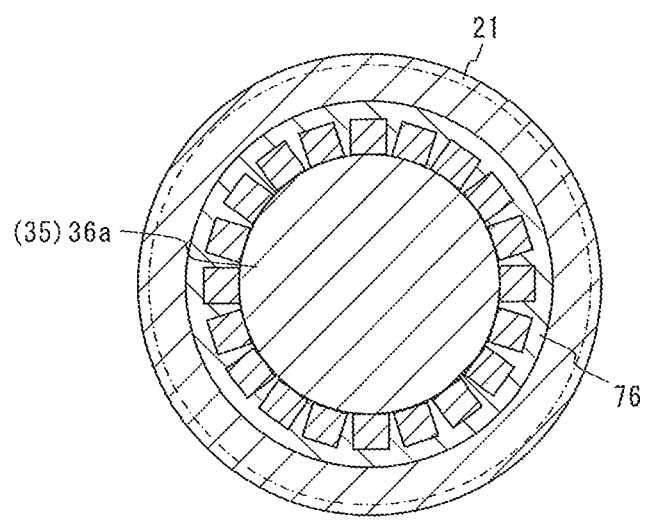
FIG. 15 is a sectional view taken along the line J-J in FIG. 5.

As shown also in FIG. 8, the coupling body 65 has the through hole 66 bored to extend from front to rear through the central portion thereof. The coupling body 65 further has a pair of second engaging grooves 68 formed in a front end surface thereof and a pair of first engaging grooves 67 formed in a rear end surface thereof, the second engaging grooves 68 being formed to be spaced apart with the through hole 66 therebetween and engaging with the second engaging portions 47, the first engaging grooves 67 similarly being formed to be spaced apart with the through hole 66 therebetween and engaging with the first engaging portions 29. The coupling body 65 is disposed in the internal space of the cylindrical body 21 with the first engaging portions 29 being slidably engaged with the first engaging grooves 67, with the second engaging portions 47 being slidably engaged with the second engaging grooves 68, and with the eccentric portion 42 of the eccentric shaft 40 being inserted in the through hole 66. Note that the through hole 66 has a diameter sufficiently larger than that of the eccentric portion 42 of the eccentric shaft 40, and therefore the coupling body 65 with the eccentric shaft 40 being inserted through the through hole 66 is movable somewhat in a plane perpendicular to the eccentric shaft 40. Further, the second engaging grooves 68 formed in the front end surface of the coupling body 65 and the first engaging grooves 67 formed in the rear end surface thereof are formed to be shifted in phase by 90 degrees with respect to each other around the axis of the through hole 66, and the coupling body 65 functions as a so-called Oldham's coupling.

Note that a liner 70 and a bearing 71 intervene between a rear end surface of the internal gear 50 and a front end surface of the flange portion 31 of the first receiving body 27, and the internal gear 50, the flange portion 60 of the screw body 55, and the liner 70 are coupled together by bolts 62. Further, the liner 70 is in contact with the rear end surface of the internal gear 50 and the bearing 71 is in contact with the front end surface of the flange portion 31 of the first receiving body 27.

Further, a liner 75 and a bearing 76 intervene between a front end surface of the small diameter portion 23 of the cylindrical body 21 and a rear end surface of the flange portion 36 of the second receiving body 35. A rear end surface of the liner 75 is spaced apart from the front end surface of the small diameter portion 23 of the cylindrical member 21 and is in contact with a front end surface of the screw member 56, and a front end surface of the bearing 76 is in contact with a rear end surface of the flange portion 36 of the second receiving body 35. Note that a small clearance is formed between the front end surface of the screw member 56 and a rear end surface of the second receiving body 35.

Note that the external gear 45, the internal gear 50, the screw member 56, and the coupling member 65 are preferably finely shot-peened for improving fatigue strength and slidability thereof.

The feed structure 20 having the above-described configuration is contained in each of the containing chambers 4 formed in the body 2 with a rear end surface of the flange portion 31 of the first receiving body 27 in contact with an inner wall surface 4a of the containing chamber 4 located inside in the radial direction of the body 2, and with a front end surface of the flange portion 36 of the second receiving body 35 in contact with an inner wall surface 4b of the containing chamber 4 located outside in the radial direction of the body 2. Note that a rear end side of the first receiving body 27 and a front end side of the second receiving body 35 are each rotatably supported by the body 2 and a support member 80 attached to the body 2.

Next, a process of gripping a solid workpiece W with the chuck 1 having the above-described configuration is described.

First, the workpiece W is arranged near the center of the body 2. Note that, prior to the arrangement of the workpiece W, each of the gripping jaws 10 is positioned at an appropriate backward position located outside in the radial direction of the body 2 so that the workpiece W can be arranged.

Subsequently, each of the first receiving bodies 27 is rotated in a normal direction by attaching an appropriate handle to the hexagonal portion 30 of the first receiving body 27. Thereby, the cylindrical body 21 whose key groove 26 is engaged with the key body 32 of the first receiving body 27 and which is rotatable integrally with the first receiving body 27 about the axis thereof is rotated in the same direction, whereby the gripping jaw 10 whose female screw position 11 is screwed with the male screw portion 22 of the cylindrical body 21 is moved toward the center of the body 2. After the gripping jaws 10 are brought into contact with an outer peripheral surface of the workpiece W, each of the first receiving bodies 27 is further rotated in the normal direction to cause the workpiece W to be gripped by the four gripping jaws 10.

Note that, because the external gear 45 is coupled to the first receiving body 27 by the coupling body 65, when the first receiving body 27 is rotated in the normal direction, the external gear 45 is also rotated in the same direction following the rotation of the first receiving body 27, and further the internal gear 50 meshing with the external gear 45 is also rotated in the same direction.

Thereafter, each of the eccentric shafts 40 is rotated in the normal direction by attaching an appropriate handle to the hexagonal portion 43 and turning the attached handle. Thereby, the external gear 45 with the eccentric portion 42 being inserted therein is turned with a radius equal to eccentricity of the eccentric portion 42 with respect to the base shaft portion 41 around the axial center M1 of the base shaft portion 41 of the eccentric shaft 40. This turning motion causes the internal gear 50 meshing with the external gear 45 to rotate in the same direction by one tooth per revolution of the eccentric shaft 40.

This mechanism is generally known as a hypocycloid mechanism, and a high reduction gear ratio can be easily obtained with a hypocycloid mechanism.

That is, the reduction gear ratio of the hypocycloid mechanism is determined by:

$$\text{Reduction gear ratio} = Z1/(Z2-Z1)+1, \quad \text{(Equation 2)}$$

where Z1 is the number of teeth of the external gear 45 and Z2 is the number of teeth of the internal gear 50. A high reduction gear ratio can be obtained by increasing the numbers of teeth of the external gear 45 and internal gear 50, provided that the internal gear 50 has more teeth than the external gear 45. Further, in the case where the number of teeth of the external gear 45 or the number of teeth of the internal gear 50 is fixed, based on the equation 2, the highest reduction gear ratio is obtained when the number of teeth of the internal gear 50 is greater by one than the number of teeth of the external gear 45.

In this connection, in the chuck 1 in this embodiment, as described above, the number of teeth of the external gear 45 is 26 and the number of teeth of the internal gear 50 is 27; therefore, the reduction gear ratio thereof is 27, which is obtained as follows:

$$\text{Reduction gear ratio} = 26/(27-26)+1. \quad \text{(Equation 3)}$$

Therefore, when the eccentric shaft 40 is rotated in the normal direction, a rotational torque input from the eccentric shaft 40 is amplified by a factor of 27 by the hypocycloid mechanism and the internal gear 50 is rotated with the amplified rotational torque. Thereby, the flange member 60 whose key groove 63 is engaged with the key portion 51 of the internal gear 50 is rotated, and the screw member 56 that is rotated integrally with the flange portion 60 through the engaging portions 59 and 62 is also rotated in the same direction with the amplified rotational torque.

Figure 16:
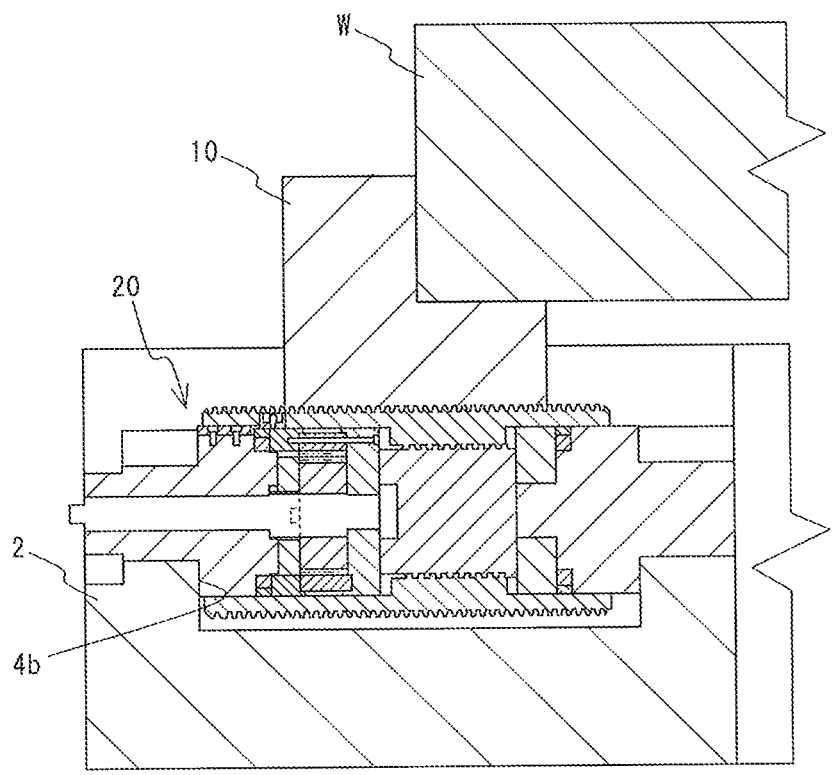
FIG. 16 is an illustration showing a state where a solid workpiece is gripped.

Further, the rotation of the screw member 56 causes the cylindrical body 21 whose female screw portion 24 is screwed with the male screw portion 57 of the screw member 56 to be moved forward along the axial direction thereof with a large force. Thereby, with respect to the gripping jaw 10 whose female screw portion 11 is screwed with the male screw portion 22 of the cylindrical body 21, a large force is added to the force of the gripping jaw 10 gripping the workpiece W; consequently, the workpiece W is strongly gripped with the amplified gipping force (see FIG. 16).

When the workpiece W is gripped with the amplified gripping force, a reaction force the gripping jaw 10 receives from the workpiece W, in other words, a force moving the screw member 56 backward, is applied to the inner wall surface 4b of the containing chamber 4 located outside in the radial direction of the body 2, through the bearing 71 intervening between the rear end surface of the internal gear 50 and the front end surface of the flange portion 31 of the first receiving body 27. Therefore, in the chuck 1 in this embodiment, the intervening bearing 71 prevents the problem that loss of output torque occurs due to friction and the like produced between the rear end surface of the internal gear 50 and the front end surface of the flange portion 31.

Note that a reaction force from the internal gear 50 is applied as a rotational torque to the external gear 45 and this rotational torque is transmitted to the first receiving body 27 through the coupling body 65. However, in the chuck 1 in this embodiment, the second engaging portions 47 of the external gear 45 are formed to be spaced apart with the through hole 46 therebetween and are engaged with the second engaging grooves 68 of the coupling body 65, and the first engaging portions 29 of the first receiving body 27 are formed to be spaced apart with the through hole 28 therebetween and are engaged with the first engaging grooves 67 of the coupling body 65. Therefore, when the rotational torque applied to the external gear 45 is transmitted to the first receiving body 27, the rotational torque acts as a couple from the second engaging portions 47 on the second engaging grooves 68 around the axis of the eccentric portion 42 of the eccentric shaft 40, which suppresses the occurrence of partial contact as occurring in the conventional devices and prevents the problems of damage to the components and loss of output torque.

When detaching the gripped workpiece W from the chuck 1, first, each of the eccentric shafts 40 is rotated in a reverse direction to cause the cylindrical body 21 to move backward. Thereafter, each of the first receiving bodies 27 is rotated in the reverse direction to cause the cylindrical member 21 to rotate in the same direction, whereby each of the gripping jaws 10 is moved backward, that is, moved in the direction away from the workpiece W. Thereby, the gripping by the gripping jaws 10 is released, which allows the workpiece W to be detached from the chuck 1.

As described above, in the chuck 1 according to this embodiment, after a workpiece W is gripped by the gripping jaws 10, with respect to each of the gripping jaws 10, a large force is applied to the force of the gripping jaw 10 gripping the workpiece W using a so-called hypocycloid mechanism. Therefore, the workpiece W can be gripped with a strong gripping force.

Further, a mechanism for amplifying the gripping force is incorporated in the feed structure 20; therefore, the device size can be reduced.

Furthermore, the external gear 45 is coupled to the first receiving body 27 by the coupling body 65 so that a rotational torque transmitted from the external gear 45 to the coupling body 65 acts as a couple on the portion of engagement between the second engaging portions 47 and the second engaging grooves 68; therefore, partial contact can be prevented and the occurrence of damage to the components and torque loss can be suppressed.

Thus, a specific embodiment of the present invention has been described; however, the present invention is not limited thereto and can be implemented in other modes.

The above embodiment has described a process of gripping a solid workpiece W with the chuck 1, by way of example; however, the chuck 1 is also capable of gripping a hollow workpiece W.

In this case, first, the workpiece W' is arranged so that its center axis is positioned near the center of the body 2. Prior to the arrangement of the workpiece W', each of the gripping jaws 10 is positioned at an appropriate forward position located inside in the radial direction of the body 2 so that the workpiece W' can be arranged.

Subsequently, each of the first receiving bodies 27 is rotated in the reverse direction using an appropriate handle attached to the hexagonal portion 30 to cause the cylindrical body 21 that is rotatable integrally with the first receiving body 27 to rotate in the same direction. Thereby, each of the gripping jaws 10 is moved toward the outside of the body 2. Further, after the gripping jaws 10 are brought into contact with an inner peripheral surface of the workpiece W', each of the first receiving bodies 27 is further rotated in the reverse direction to cause the workpiece W' to be gripped by the four gripping jaws 10.

Figure 17:
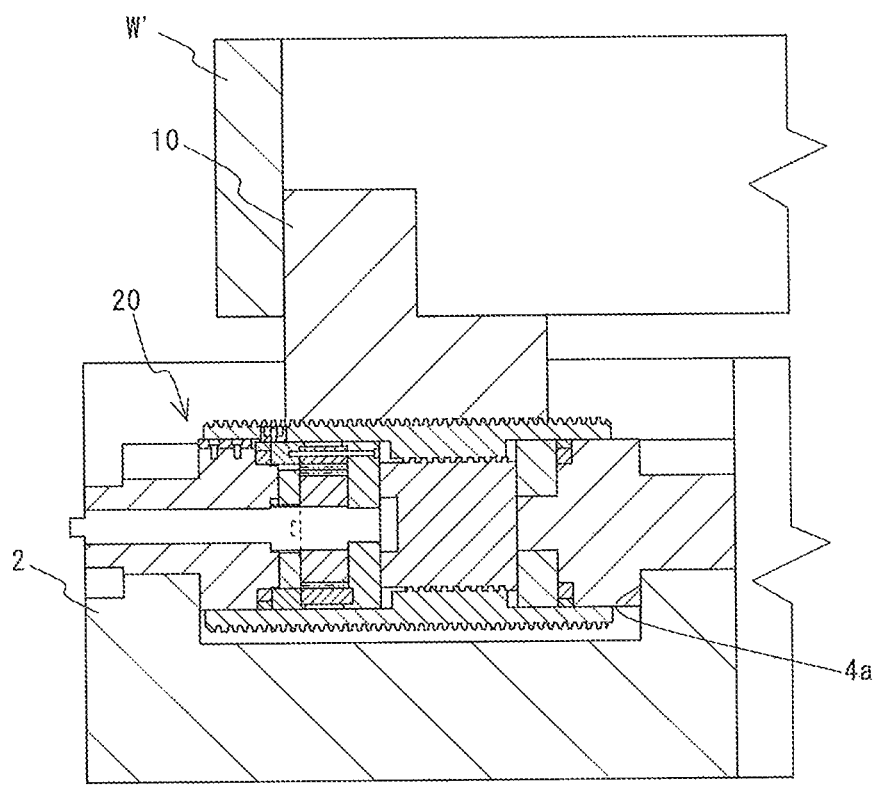
FIG. 17 is an illustration showing a state where a hollow workpiece is gripped.
Figure 18:
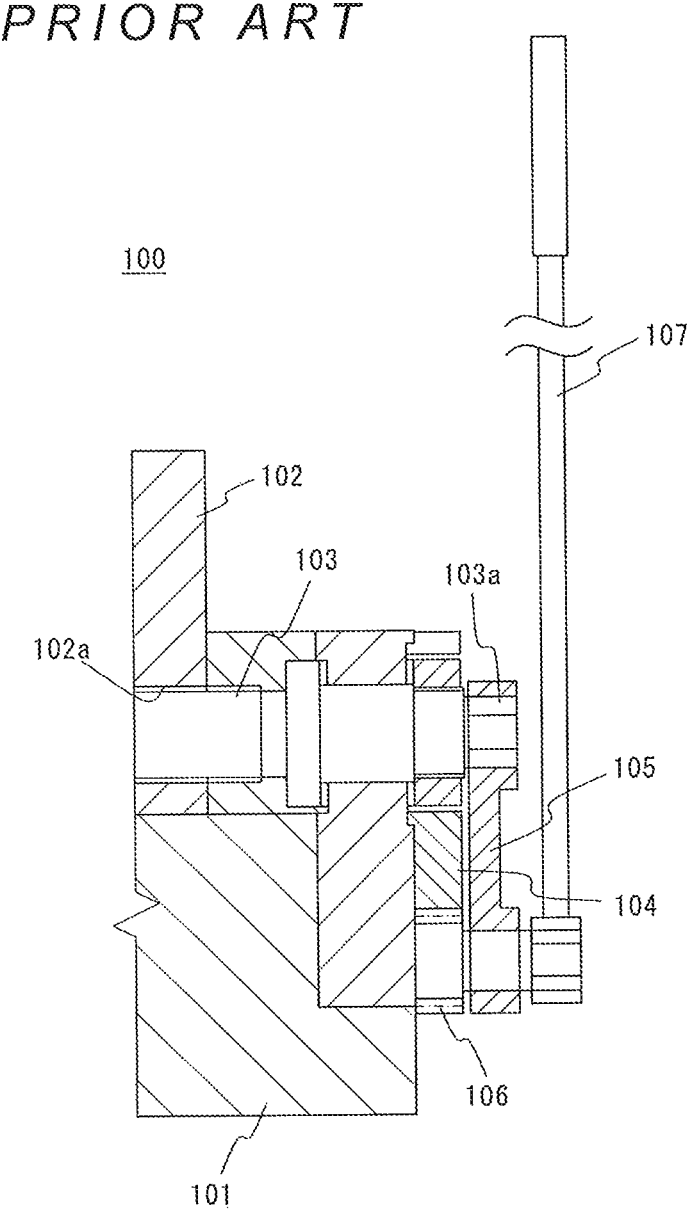
FIG. 18 is a sectional view of a part of a conventional chuck.
Figure 19:
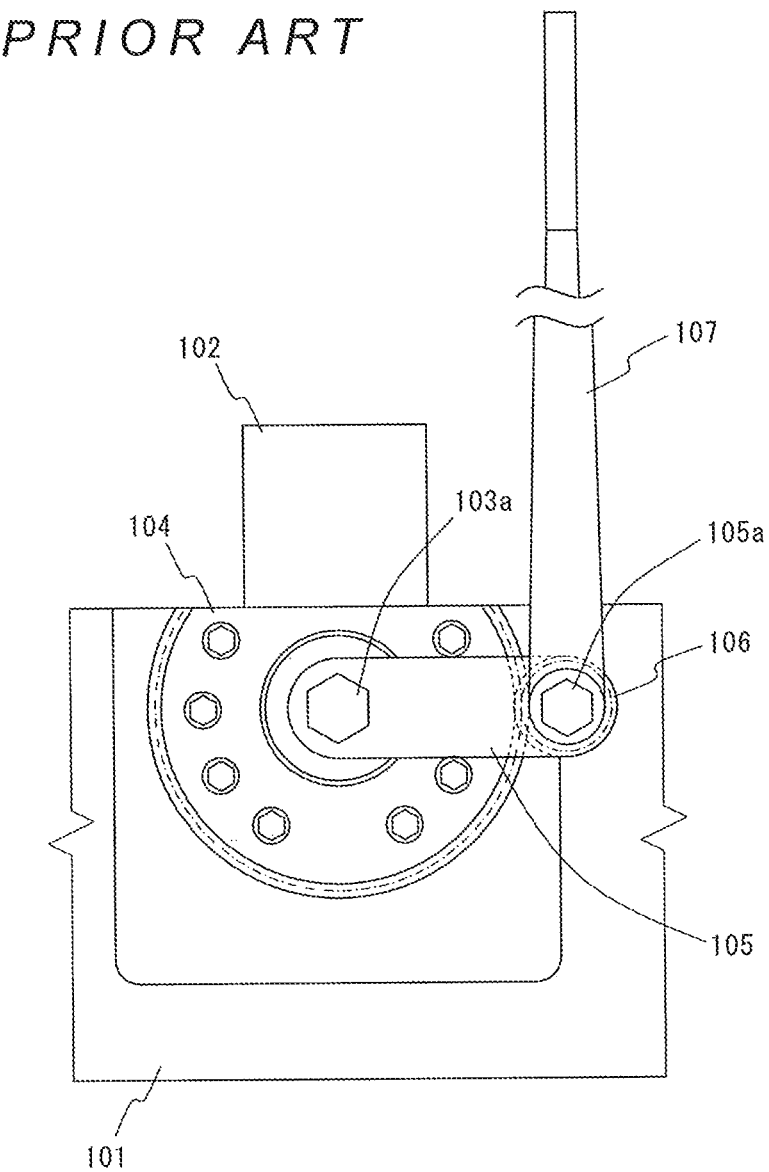
FIG. 19 is side view of a part of the conventional chuck.
Figure 20:
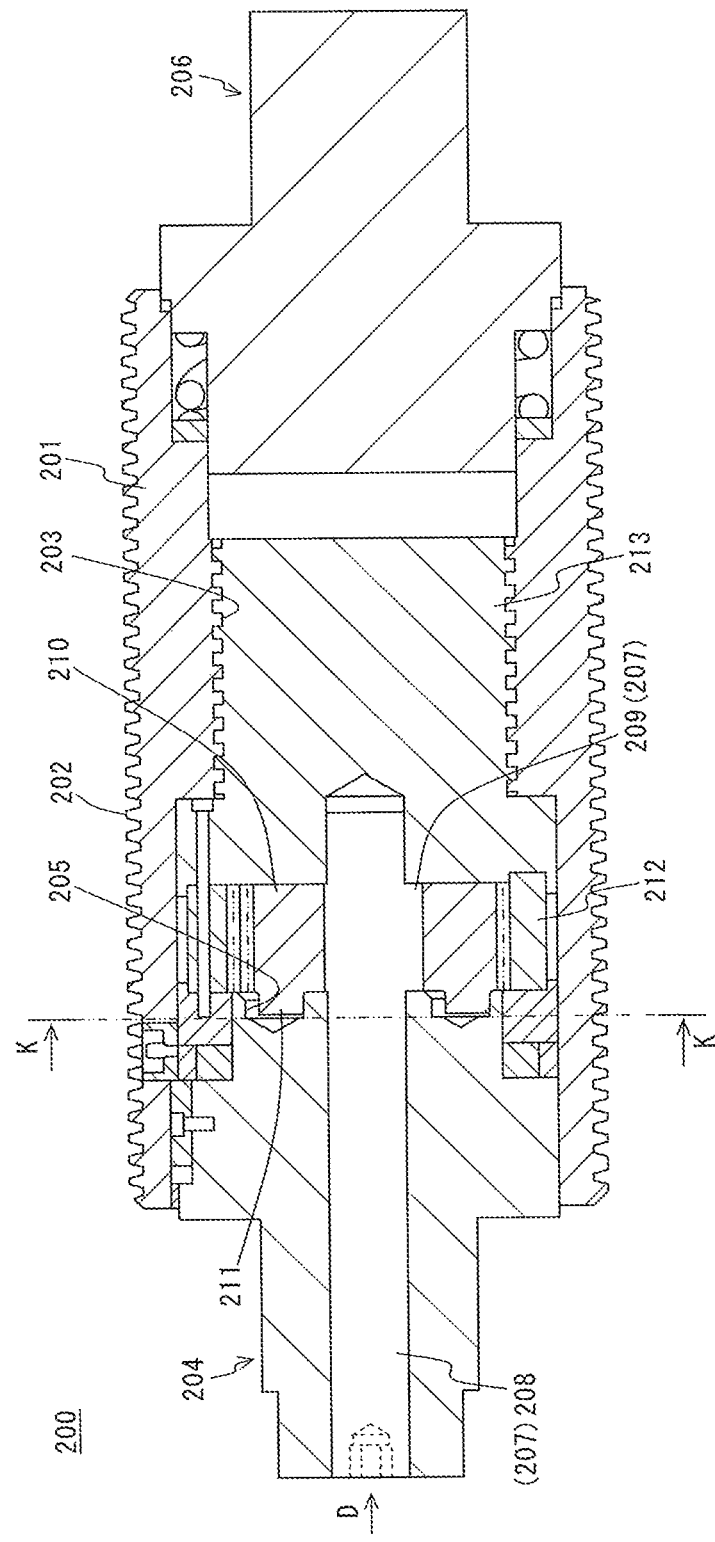
FIG. 20 is a sectional view of a conventional feed structure.
Figure 21:
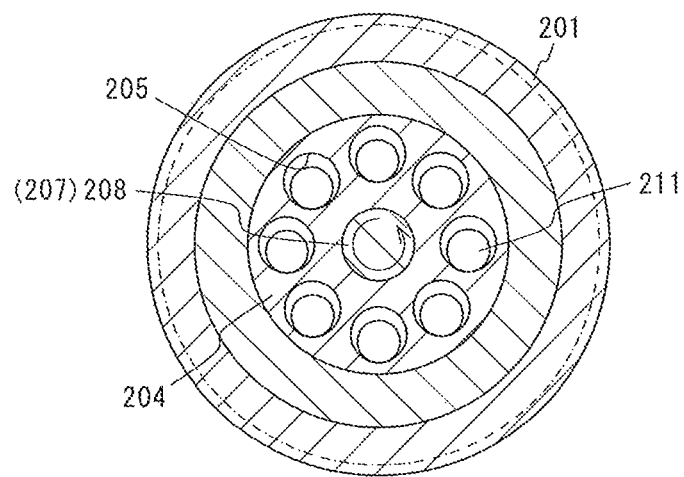
FIG. 21 is a sectional view taken along the line K-K in FIG. 20.

Subsequently, each of the eccentric shafts 40 is rotated in the reverse direction using an appropriate handle attached thereto. Thereby, the external gear 45 with the eccentric portion 42 being inserted therein is turned in a direction opposite to the turning direction in the above embodiment and the internal gear 50 is rotated in the same direction by one tooth per revolution of the eccentric shaft 40, whereby the flange member 60 and the screw member 56 engaged with the flange member 60 are rotated in the reverse direction with a rotational torque which is amplified by a factor of 27 by the hypocycloid mechanism. Thereby, the cylindrical body 21 is moved backward along the axial direction thereof with a large force and, with respect to the gripping jaw 10, a large force is added to the force of the gripping jaw 10 gripping the workpiece W'; consequently, the workpiece W' is gripped with the amplified gripping force (see FIG. 17).

Note that, when the workpiece W' is gripped, a reaction force the gripping jaw 10 receives from the workpiece W', in other words, a force moving the screw member 56 forward, is applied to the inner wall surface 4a of the containing chamber 4 located inside in the radial direction of the body 2, through the bearing 76 intervening between the front end surface of the small diameter portion 23 of the cylindrical body 21 and the rear end surface of the flange portion 36 of the second receiving body 35. The provision of the bearing 76 prevents friction and the like between the cylindrical body 21 and the second receiving body 35, which allows the hollow workpiece W' to be gripped while suppressing torque loss as much as possible.

In the case where the shape of the workpiece to be gripped is fixed, a configuration may be employed in which only either one of the two bearings 71 and 76 is provided. That is, in the case of a chuck dedicated to gripping a solid workpiece, a configuration may be employed in which only the bearing 71 is provided, while in the case of a chuck dedicated to gripping a hollow workpiece, a configuration may be employed in which only the bearing 76 is provided.

Further, in the above embodiment, the combination of the external gear 45 and the internal gear 50 is such that the reduction gear ratio thereof is 27. However, the present invention is not limited thereto and it is possible to combine gears having different numbers of teeth as appropriate in accordance with a required reduction gear ratio.

Further, in the above embodiment, the first and second engaging grooves 67 and 68 are provided on the coupling body 65 and the first and second engaging portions 29 and 47 are provided on the first receiving body 27 and the external gear 45, respectively. However, the present invention is not limited thereto, and a configuration may be employed in which first and second engaging portions are provided on a coupling body and first and second engaging grooves are provided on a first receiving body and an external gear, respectively. Alternatively, a configuration may be employed in which first engaging grooves and second engaging portions are provided on a coupling body and first engaging portions and second engaging grooves are provided on a first receiving body and an external gear, respectively. Further alternatively, a configuration may be employed in which first engaging portions and second engaging grooves are provided on a coupling body and first engaging grooves and second engaging portions are provided on a first receiving body and an external gear, respectively.

Further, the above embodiment has the configuration in which the first engaging portions 29, the second engaging portions 47, and the first and second engaging grooves 67 and 68 are respectively formed to be spaced apart with the though holes 28, 46, and 66 therebetween, through which the eccentric shaft 40 is inserted. However, a configuration may be employed in which engaging grooves are provided not to intersect the axes of the though holes 28, 46, and 66 and they are not spaced apart.

Further, in the above embodiment, a workpiece W is gripped by the four gripping jaws 10. However, for example, a workpiece may be gripped by two gripping jaws 10 and two gripping bodies fixed to the surface of the body 2. In this case, the gripping jaws 10 and the gripping bodies are provided so that the gripping jaws 10 respectively face the gripping bodies, and they are arranged at equal intervals in the circumferential direction of the body 2.

In this case, in the case of a solid workpiece W, the workpiece W is placed on the body 2 with an outer peripheral surface thereof in contact with the two gripping bodies, while in the case of a hollow workpiece W', the workpiece W' is placed on the body 2 with an inner peripheral surface thereof in contact with the two gripping bodies. Thereafter, the cylindrical bodies 21 are rotated by rotating the first receiving bodies 27, whereby the gripping jaws 10 are moved toward the workpiece W, W'. Note that, in the case of gripping the solid workpiece W, the gripping jaws 10 are moved forward by rotating the first receiving bodies 27 in the normal direction, while in the case of gripping the hollow workpiece W', the gripping jaws 10 are moved backward by rotating the first receiving bodies 27 in the reverse direction.

After the gripping jaws 10 are brought into contact with the outer peripheral surface of the workpiece W or the inner peripheral surface of the workpiece W', the cylindrical bodies 21 are further rotated, and thereby the workpiece W, W' is gripped by the two gripping jaws 10 and the two gripping bodies.

Thereafter, each of the eccentric shafts 40 is rotated in the normal direction or in the reverse direction, whereby the screw body 55 (the screw member 56 and the flange member 60) is rotated in the same direction with a rotational torque which is amplified by the hypocycloid mechanism in the feed structure 20. Thereby, the cylindrical body 21 whose female screw portion 24 is screwed with the male screw portion 57 of the screw member 56 of the screw body 55 is moved forward or backward, and thereby the gripping jaw 10 is moved forward or backward. Thereby, a large force is added to the gripping force acting on the workpiece W, W; consequently, the workpiece W, W' is gripped with the amplified gripping force.

Note that the number of gripping jaws 10 and the number of gripping bodies are not limited to the above numbers. That is, for example, a configuration may be employed in which one gripping jaw 10 and two gripping bodies are provided. Further, a configuration may be employed in which one gripping jaw 10 and one gripping body are provided and they are arranged to face each other. In this case, it should be understood that the present invention is embodied as a vice.

The invention claimed is:

1. A feed structure comprising:
   a cylindrical body having a male screw portion formed on an outer peripheral surface thereof and having a female screw portion formed on at least a portion of an inner peripheral surface thereof;
   a first receiving body having a through hole formed through a central portion thereof, and fitted in one end side of the cylindrical body with an axis of the through hole coincident with an axis of the cylindrical body;
   a second receiving body fitted in another end side of the cylindrical body;
   a screw body disposed between the first receiving body and the second receiving body within the cylindrical body with a male screw portion formed on an outer peripheral surface thereof being screwed with the female screw portion formed on the inner peripheral surface of the cylindrical body, the screw body having a receiving hole formed in a surface thereof facing the first receiving body;
   an eccentric shaft including a base shaft portion and an eccentric portion eccentric to an axis of the base shaft portion, both ends of the base shaft portion being respectively rotatably inserted in the through hole of the first receiving body and the receiving hole of the screw body;
   an internal gear having a teeth portion formed on an inner peripheral surface thereof coaxially with an outer peripheral surface thereof, and disposed between the first receiving body and the screw body in a state of being engaged with the screw body so as to be rotatable integrally with the cylindrical body about the axis of the cylindrical body;
   an external gear having a teeth portion formed on an outer peripheral surface thereof, having a through hole formed to extend from front to rear through a central portion thereof, and disposed inside the internal gear with a part of the teeth portion thereof meshing with a part of the teeth portion of the internal gear, and with the eccentric portion of the eccentric shaft being rotatably fitted through the through hole thereof; and
   a coupling body having a through hole formed to extend from front to rear through a central portion thereof, and disposed between the first receiving body and the external gear with the eccentric portion of the eccentric shaft being rotatably fitted through the through hole thereof;
   the cylindrical body is engaged with the first receiving body so as to be rotatable integrally with the first receiving body about the axis of the cylindrical body,
   the coupling body and the first receiving body are engaged with each other by a first engaging mechanism,
   the coupling body and the external gear are engaged with each other by a second engaging mechanism,
   the first engaging mechanism is composed of a first engaging groove and a first engaging portion, the first engaging groove being formed in either one of a surface of the coupling body facing the first receiving body and a surface of the first receiving body facing the coupling body, the first engaging portion being formed on another one of the surfaces to protrude therefrom and being engaged with the first engaging groove in a manner to be slidable along the first engaging groove,
   the second engaging mechanism is composed of a second engaging groove and a second engagement portion, the second engaging groove being formed in either one of a surface of the coupling body facing the external gear and a surface of the external gear facing the coupling body, the second engaging portion being formed on another one of the surfaces to protrude therefrom and being engaged with the second engaging groove in a manner to be slidable along the second engaging groove,
   the first engaging groove and the second engaging groove are shifted in phase with respect to each other around an axis of the through hole of the coupling body in a state where the coupling body is engaged with the first receiving body and engaged with the external gear, and
   the internal gear has more teeth than the external gear.

2. The feed structure according to claim 1, in which the internal gear has one more tooth than the external gear.

3. A gripping device comprising:
   the feed structure of claim 1;
   a body having at least two guide grooves provided to extend radially with respect to a predetermined point on a surface thereof; and
   at least two gripping jaws disposed to be respectively engaged with the guide grooves of the body and provided in a manner to be movable forward and backward along the guide grooves, each of the gripping jaws having a female screw portion formed along the guide groove, wherein,
   the feed structure is disposed below each of the gripping jaws in each of the guide grooves with the first receiving body and the second receiving body being rotatably supported, and with the male screw portion formed on the outer peripheral surface of the cylindrical body being screwed with the female screw portion of the gripping jaw.

4. A gripping device comprising:
   the feed structure of claim 1;

a body having at least one guide groove provided in a surface thereof;

at least one gripping body fixed to or movably provided on the surface of the body; and at least one gripping jaw disposed to be engaged with the guide groove of the body, provided in a manner to be movable forward and backward along the guide groove, and having a female screw portion formed along the guide groove, wherein, a disposed direction of the guide groove and a moving direction of the gripping body are set to be radial with respect to a predetermined point on the surface of the body, and the feed structure is disposed below the gripping jaw in the guide groove with the first receiving body and the second receiving body being rotatably supported, and with the male screw portion formed on the outer peripheral surface of the cylindrical body being screwed with the female screw portion of the gripping jaw.

* * * * *